US008735762B2

(12) United States Patent
Murai et al.

(10) Patent No.: US 8,735,762 B2
(45) Date of Patent: May 27, 2014

(54) WIRE ELECTRIC DISCHARGE MACHINE CAPABLE OF DETECTING MACHINING STATE AND DETERMINING AVERAGE VOLTAGE IN MACHINING GAP

(71) Applicant: Fanuc Corporation, Yamanashi (JP)

(72) Inventors: Masao Murai, Yamanashi (JP);
Tomoyuki Furuta, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 2 days.

(21) Appl. No.: 13/680,392

(22) Filed: Nov. 19, 2012

(65) Prior Publication Data
US 2013/0193112 A1 Aug. 1, 2013

(30) Foreign Application Priority Data

Feb. 1, 2012 (JP) ................................. 2012-019379

(51) Int. Cl.
B23H 7/00 (2006.01)
B23H 7/14 (2006.01)
G05B 15/00 (2006.01)

(52) U.S. Cl.
USPC ...................... 219/69.12; 219/69.13; 700/162

(58) Field of Classification Search
USPC .............................. 219/69.12, 69.13; 700/162
IPC ......................................................... B23H 7/06
See application file for complete search history.

(56) References Cited

U.S. PATENT DOCUMENTS

| 2,835,785 | A | * | 5/1958 | Williams ..................... 219/69.18 |
| 4,292,491 | A | * | 9/1981 | Tanaka et al. ............... 219/69.12 |
| 4,720,616 | A | * | 1/1988 | Inoue .......................... 219/69.18 |
| 4,725,706 | A | * | 2/1988 | Inoue .......................... 219/69.12 |
| 4,798,929 | A | * | 1/1989 | Itoh ............................. 219/69.12 |
| 4,870,243 | A | * | 9/1989 | Wilson et al. ............... 219/69.14 |
| 5,187,341 | A | * | 2/1993 | Graell ......................... 219/69.13 |

(Continued)

FOREIGN PATENT DOCUMENTS

| EP | 2269755 A2 | 1/2011 |
| JP | 51-15896 A | 2/1976 |
| JP | 61-004620 A | 1/1986 |
| JP | 61-260915 A | 11/1986 |

(Continued)

OTHER PUBLICATIONS

Office Action corresponding to JP2011-019379, dated Jan. 22, 2013.

Primary Examiner — Dana Ross
Assistant Examiner — Gyounghyun Bae
(74) Attorney, Agent, or Firm — Lowe Hauptman & Ham, LLP

(57) ABSTRACT

In order to detect a machining state of a wire electric discharge machine, the state of a machining gap is classified into three categories; an open-circuit state in which electric discharge does not occur after a first predetermined level is reached or surpassed by a machining-gap voltage, an electric discharge state in which electric discharge occurs after a second predetermined level is reached or surpassed by the machining-gap voltage, whereby the machining-gap voltage becomes lower than the second predetermined level, and a short-circuit state wherein a third predetermined level is not reached or surpassed by the machining-gap voltage. An average voltage in the machining gap is determined based on voltages in these states and the number of cycles of voltage application to the machining gap, number of open-circuits, number of discharges, and number of short-circuits per unit time.

12 Claims, 5 Drawing Sheets

(56) References Cited

U.S. PATENT DOCUMENTS

| | | | | |
|---|---|---|---|---|
| 5,756,956 | A * | 5/1998 | Sato et al. | 219/69.18 |
| 7,262,381 | B2 * | 8/2007 | Hiraga et al. | 219/69.12 |
| 7,528,340 | B2 * | 5/2009 | Yoneda et al. | 219/69.13 |
| 7,816,620 | B2 * | 10/2010 | Buhler et al. | 219/69.18 |
| 2005/0040142 | A1 * | 2/2005 | Kawahara et al. | 219/69.12 |
| 2005/0263493 | A1 * | 12/2005 | Kurihara et al. | 219/69.12 |

FOREIGN PATENT DOCUMENTS

| | | |
|---|---|---|
| JP | 63-068317 A | 3/1988 |
| JP | 9-314420 A | 12/1997 |
| JP | 2002254250 A | 9/2002 |
| JP | 2010-280046 A | 12/2010 |
| WO | 2004022275 A1 | 3/2004 |

* cited by examiner

WIRE ELECTRIC DISCHARGE MACHINE CAPABLE OF DETECTING MACHINING STATE AND DETERMINING AVERAGE VOLTAGE IN MACHINING GAP

RELATED APPLICATIONS

The present application is claims priority from Japanese Application No. 2012-019379 filed Feb. 1, 2012, the disclosure of which is hereby incorporated by reference herein in its entirety.

BACKGROUND OF THE INVENTION

1. Field of the Invention

The present invention relates to a wire electric discharge machine configured so that its machining state can be detected.

2. Description of the Related Art

In electric discharge machining, a voltage is applied to an electrode in a working fluid and a workpiece, thereby generating arc discharge. The moment the workpiece is melted by heat generated by the electric discharge, the working fluid is heated and explosively vaporizes, thereby blowing off melted portions of the workpiece. Machining is performed by frequently repeating this process. Since small discharge craters created by the electric discharge are collected to form a machined surface, moreover, the surface roughness depends on the size of each individual discharge crater.

Thus, it is known that a fine machined surface can be obtained by applying a high-frequency AC voltage (FIG. 1) to a machining gap and frequently repeating electric discharge of a short time duration. For example, Japanese Patent Application Laid-Open No. 61-260915 discloses how a machined surface with a surface roughness of 1 μm Rmax or less can be obtained by machining a workpiece with a high-frequency AC voltage of 1 to 5 MHz. If a high-frequency AC voltage is used for machining, however, it is difficult to precisely detect the machining state, and there is a lot of room for an improvement in machining accuracy.

In general, in electric discharge machining, an average of absolute values of machining-gap voltages is measured to determine the machining state, the electrode feed rate is controlled, and machining conditions are changed and controlled. The average machining-gap voltage practically represents a machining-gap distance, so that a high-precision machining shape can be obtained by performing electrode feed control such that the average machining-gap voltage is constant.

If a high-frequency AC voltage of several MHz or more is used, however, the response of a detection circuit to determine an average voltage is degraded, so that there is a problem of serious measurement errors. With use of a high-frequency voltage, moreover, the slightest variation in the component characteristics of a voltage application circuit is non-negligible, so that the machining voltage inevitably varies depending on the machine. If axis feed control is performed based on such data, the result of machining inevitably varies according to the machine. Consequently, the control based on the average voltage detection involves many problems such that the electrode feed rate must be made constant, thus hindering the improvement in machining accuracy.

To overcome this, International Publication No. 2004/022275 discloses a technique in which a DC voltage is superposed on a high-frequency AC voltage to be applied, and only a low-frequency voltage ingredient of a machining-gap voltage is extracted by means of a low-pass filter. The feed rate of an electrode is controlled according to the change of the extracted voltage ingredient. Since the average voltage inevitably cannot be zero according to this technique, electrolytic corrosion may possibly occur in a workpiece or machine body. Since the low-pass filter is used, moreover, the response is too poor to enable follow-up in case of a sudden change of electric discharge conditions. Further, the flow of the working fluid in the machining gap varies depending on the machining shape. If the concentration of sludge accumulated in the machining gap changes, the machining-gap impedance changes without the change of the discharge conditions, so that the average voltage may sometimes vary. In some cases, therefore, the average voltage may fail to correctly reflect machining conditions, such as the frequency of electric discharge.

The number of discharges per unit time is an electric discharge characteristic value other than the average voltage. Japanese Patent Application Laid-Open No. 2002-254250 discloses a technique in which the electrode feed rate, off time, and working fluid density are controlled by detecting the discharge number per unit time. The discharge number is an index that is more hardly affected by disturbances due to the sludge density, specific resistance of the working fluid, etc., than the average voltage. Japanese Patent Application Laid-Open No. 2010-280046 discloses a technique in which the discharge number is determined and counted during high-frequency AC machining.

Conventionally, however, the discharge number cannot be detected in a high-precision finish machining application, so that the relationship between the discharge number and optimal electrode feed rate control is not yet fully clarified. Even though the discharge number can be counted, therefore, there is no specific means that enables effective use of the discharge number for machining control.

SUMMARY OF THE INVENTION

Accordingly, the object of the present invention is to provide a wire electric discharge machine, configured so that a machining state for each voltage application cycle is determined in a high-precision finish machining application based on a high-frequency AC voltage, and an average voltage is calculated from the number of voltage application cycles for each unit time, whereby the calculated average voltage depending on a correct machining state can be determined to enable correct control of the electrode feed rate and other machining condition settings, even when the analog average voltage is affected by various disturbances.

A first form of a wire electric discharge machine according to the present invention comprises: a voltage application unit configured to apply positive and negative voltages to the machining gap for a period of one microsecond or less with an off time equal to or longer than a voltage application time set during each cycle of voltage application; a machining-gap voltage detection unit configured to detect a machining-gap voltage produced in the machining gap; an application cycle number counting unit configured to count for each unit time the number of application cycles of the voltages applied by the voltage application unit; an open-circuit determination unit configured to determine an open-circuit state in which electric discharge does not occur after a predetermined open-circuit determination voltage level is reached or surpassed by the machining-gap voltage detected by the machining-gap voltage detection unit; an open-circuit number counting unit configured to count for each unit time the number of voltage application cycles determined to be in an open-circuit state by the open-circuit determination unit, as an open-circuit number; an electric discharge determination unit configured to determine an electric discharge state in which electric discharge occurs after a predetermined electric discharge determination voltage level is reached or surpassed by the machining-gap voltage detected by the machining-gap voltage detection unit, thereafter, the machining-gap voltage becomes lower than the electric discharge determination voltage level; and a discharge number counting unit configured to count for each unit time the number of voltage application cycles determined to be in an electric discharge state by the electric discharge determination unit, as a discharge number. The average voltage in the machining gap is determined based on a first predetermined voltage corresponding to the machining-gap voltage in the open-circuit state, a second predetermined voltage corresponding to the machining-gap voltage in the electric discharge state, the number of voltage application cycles per unit time counted by the application cycle number counting unit, the open-circuit number per unit time counted by the open-circuit number counting unit, and the discharge number per unit time counted by the discharge number counting unit.

The average voltage in the machining gap may be calculated as follows:

Average machining-gap voltage={(open-circuit number×first predetermined voltage)+(discharge number×second predetermined voltage)}/(application cycle number).

At least one of the determination voltage levels for the determination of the open-circuit state and the electric discharge state may be made variable depending on a power supply voltage of the voltage application unit, a workpiece thickness, a wire diameter, and/or a workpiece material.

At least one of the first and second predetermined voltages may be made variable depending on a power supply voltage of the voltage application unit, a workpiece thickness, a wire diameter, and/or a workpiece material.

A second form of the wire electric discharge machine according to the present invention comprises: a voltage application unit configured to apply positive and negative voltages to the machining gap for a period of one microsecond or less with an off time equal to or longer than a voltage application time set during each cycle of voltage application; a machining-gap voltage detection unit configured to detect a machining-gap voltage produced in the machining gap; an application cycle number counting unit configured to count for each unit time the number of application cycles of the voltages applied by the voltage application unit; an open-circuit determination unit configured to determine an open-circuit state in which electric discharge does not occur after a predetermined open-circuit determination voltage level is reached or surpassed by the machining-gap voltage detected by the machining-gap voltage detection unit; an open-circuit number counting unit configured to count for each unit time the number of voltage application cycles determined to be in an open-circuit state by the open-circuit determination unit, as an open-circuit number; an electric discharge determination unit configured to determine an electric discharge state in which electric discharge occurs after a predetermined electric discharge determination voltage level is reached or surpassed by the machining-gap voltage detected by the machining-gap voltage detection unit, thereafter, the machining-gap voltage becomes lower than the electric discharge determination voltage level; a discharge number counting unit configured to count for each unit time the number of voltage application cycles determined to be in an electric discharge state by the electric discharge determination unit, as a discharge number; a short-circuit determination unit configured to determine a short-circuit state in which a predetermined short-circuit determination voltage level is not reached or surpassed by the machining-gap voltage detected by the machining-gap voltage detection unit during 1 cycle of the voltage application; and a short-circuit number counting unit configured to count for each unit time the number of voltage application cycles determined to be in a short-circuit state by the short-circuit determination unit, as a short-circuit number. The average voltage in the machining gap is determined based on a first predetermined voltage corresponding to the machining-gap voltage in the open-circuit state, a second predetermined voltage corresponding to the machining-gap voltage in the electric discharge state, a third predetermined voltage corresponding to the machining-gap voltage in the short-circuit state, the number of application cycles per unit time counted by the application cycle number counting unit, the open-circuit number per unit time counted by the open-circuit number counting unit, the discharge number per unit time counted by the discharge number counting unit, and the short-circuit number per unit time counted by the short-circuit number counting unit.

The average voltage in the machining gap may be calculated as follows:

Average machining-gap voltage={(open-circuit number×first predetermined voltage)+(discharge number×second predetermined voltage)+(short-circuit number×third predetermined voltage)}/(application cycle number).

At least one of the determination voltage levels for the determination of the open-circuit state, the electric discharge state, and the short-circuit state may be made variable depending on a power supply voltage of the voltage application unit, a workpiece thickness, a wire diameter, and/or a workpiece material.

At least one of the first to third predetermined voltages may be made variable depending on a power supply voltage of the voltage application unit, a workpiece thickness, a wire diameter, and/or a workpiece material.

A third form of the wire electric discharge machine according to the present invention comprises: a voltage application unit configured to apply positive and negative voltages to the machining gap for a period of one microsecond or less with an off time equal to or longer than a voltage application time set during each cycle of voltage application; a machining-gap voltage detection unit configured to detect a machining-gap voltage produced in the machining gap; an application cycle number counting unit configured to count for each unit time the number of application cycles of the voltages applied by the voltage application unit; a short-circuit determination unit configured to determine a short-circuit state in which a predetermined short-circuit determination voltage level is not reached or surpassed by the machining-gap voltage detected by the machining-gap voltage detection unit during 1 cycle of the voltage application; and a short-circuit number counting unit configured to count for each unit time the number of voltage application cycles determined to be in a short-circuit state by the short-circuit determination unit, as a short-circuit number. The average voltage in the machining gap is determined based on a fourth predetermined voltage corresponding to the machining-gap voltage in the open-circuit state and the electric discharge state, the number of application cycles per unit time counted by the application cycle number counting unit, and the short-circuit number per unit time counted by the short-circuit number counting unit.

The average voltage in the machining gap may be calculated as follows:

Average machining-gap voltage=(application cycle number−short-circuit number)×(fourth predetermined voltage)/(application cycle number).

The determination voltage level for the determination of the short-circuit state may be made variable depending on a power supply voltage of the voltage application unit, a workpiece thickness, a wire diameter, and/or a workpiece material.

The fourth predetermined voltage may be made variable depending on a power supply voltage of the voltage application unit, a workpiece thickness, a wire diameter, and/or a workpiece material.

According to the present invention, there can be provided a wire electric discharge machine, configured so that a machining state for each voltage application cycle is determined in a high-precision finish machining application based on a high-frequency AC voltage, and an average voltage is determined from the number of voltage application cycles for each unit time, whereby an average voltage depending on a correct machining state can be determined to enable correct control of the electrode feed rate and the like corresponding to the machining state even when the analog average voltage is affected by various disturbances.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A wire electric discharge machine according to the present invention machines a workpiece using a trapezoidal voltage waveform with an off time equal to or longer than an application time set during the application of bipolar voltages, positive and negative. The number of voltage application cycles is counted with the machining-gap state classified into some categories; an open-circuit state, electric discharge state, and short-circuit state, etc., for each voltage application cycle. Based on the resulting cycle count, an average machining voltage is calculated and a machining state is recognized. Then, the electrode feed rate and other machining condition settings are controlled.

Figure 1:
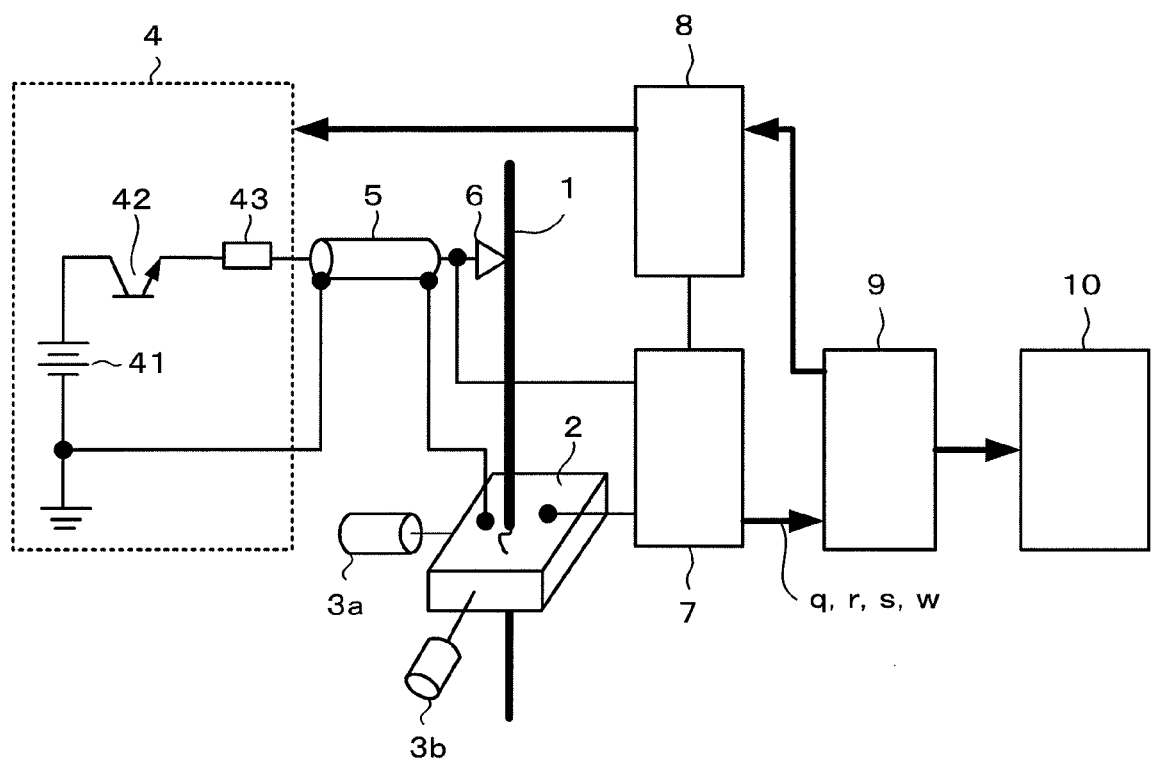
FIG. 1 is a schematic diagram showing a wire electric discharge machine.

FIG. 1 is a schematic diagram of the wire electric discharge machine. A working tank (not shown) is disposed in a travel path for a wire electrode 1, in an electric discharge machining unit in the wire electric discharge machine. The working tank is filled with a working fluid. The wire electrode 1 and a workpiece 2 are connected to a working power supply 4, which is a high-frequency power unit for wire electric discharge machining, by a cable 5, which is a working voltage supply cable.

The working power supply 4 comprises a DC voltage source 41, a high-speed switching device 42 constituting a bridge circuit, and a series resistor 43. The series resistor 43 combines functions of limiting output current from the working power supply 4 and suppressing vibration of the working power supply 4 and a machining gap. In response to a command from a working power supply controller 8, the working power supply 4 applies a working power supply output (FIGS. 2A to 2C) to the machining gap between the wire electrode 1 and the workpiece 2 through the cable 5 and a feeding portion 6. The workpiece 2 is connected to the working power supply 4 by the cable 5. Only one polarity is illustrated in FIG. 1 for simplicity.

The working power supply controller 8 receives commands associated with the application time, off time, and detection time from a numerical controller 9. The working power supply controller 8 controls the working power supply 4 in response to the commands from the numerical controller 9. The working power supply controller 8 generates a pulse for each application cycle in association with the detection time. The application time, off time, and detection time will be described later with reference to FIGS. 2A to 2C and 3A to 3C.

A machining state detection unit 7 detects a voltage produced in the machining gap between the wire electrode 1 and the workpiece 2. Based on the detected voltage in the machining gap, the numbers of application cycles, open-circuits, discharges, and short-circuits per unit time are determined by a machining state determination circuit (FIG. 4) in the machining state detection unit 7. Data on the number of application cycles (q), number of open-circuits (r), number of discharges (s), and number of short-circuits (w) determined per unit time are delivered to the numerical controller 9.

The numerical controller 9 controls a servo drive unit 10, based on the numbers of application cycles, open-circuits, discharges, and short-circuits per unit time delivered from the machining state detection unit 7. The servo drive unit 10 drives servomotors 3a and 3b to relatively move the wire electrode 1 and the workpiece 2, thereby performing electric discharge machining on the workpiece 2.

Figure 2A:
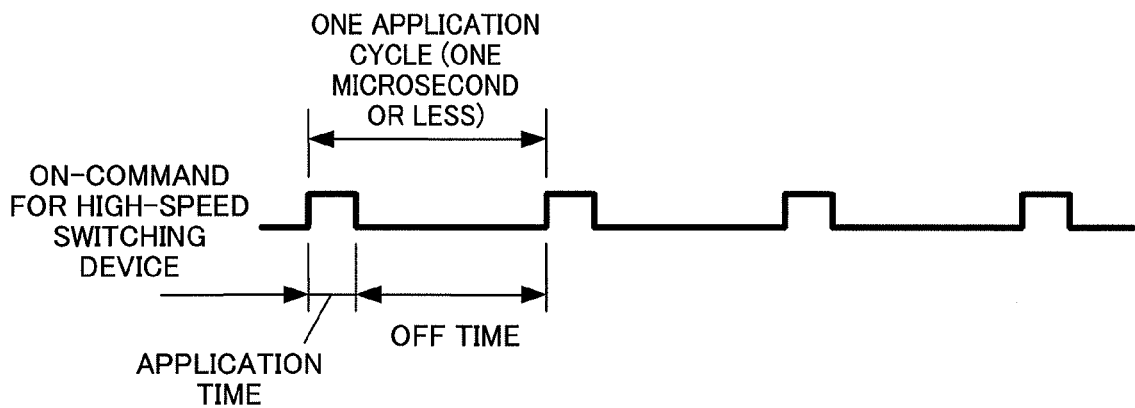
FIGS. 2A to 2C are diagrams illustrating an example in which bipolar voltages, positive and negative, are applied to a machining gap between a wire electrode and a workpiece for a period of one microsecond or less with an off time equal to or longer than an application time set during each cycle of voltage application.
Figure 2B:
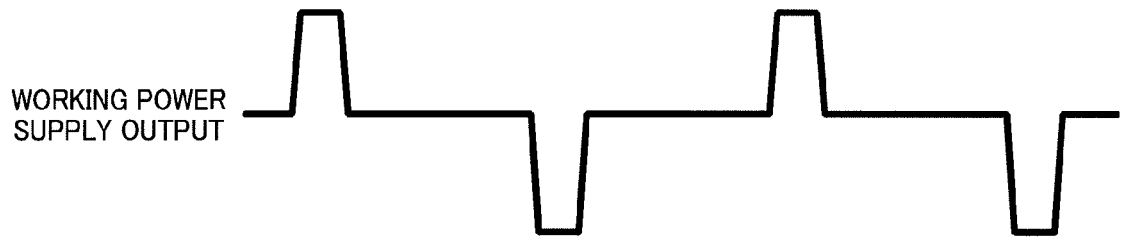
Figure 2C:
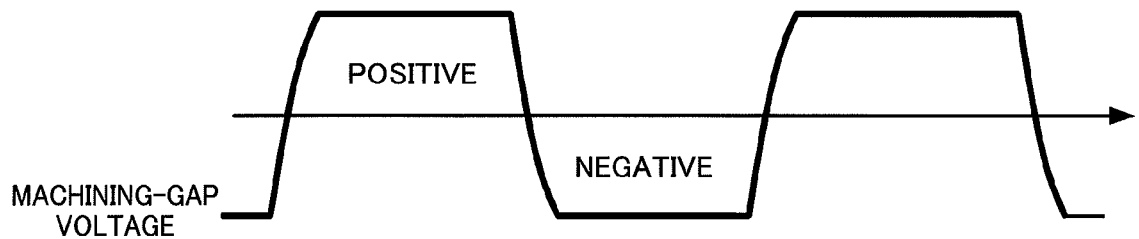

FIGS. 2A to 2C are diagrams illustrating an example in which bipolar voltages, positive and negative, are applied to the machining gap between the wire electrode 1 and the workpiece 2 for a period of one microsecond or less with the off time equal to or longer than the application time set during each cycle of voltage application. FIG. 2A represents an on-command for the high-speed switching device 42 shown in FIG. 1. FIG. 2B shows the waveform of the working power supply output delivered from the working power supply 4. FIG. 2C shows the waveform of a machining-gap voltage produced by the working power supply output of FIG. 2B and applied to a machining gap 11.

Although positive and negative voltages are shown to be alternately applied in FIGS. 2A to 2C, two or more positive or negative voltages may be consecutively applied. According to this method, stray capacitances exist in the machining gap 11 and the cable 5. If electric discharge does not occur, therefore, reductions in voltage are negligible. Consequently, the voltage waveform during the off time is substantially flat, while the waveform of the machining-gap voltage is substantially trapezoidal.

A method of determining open-circuit, electric discharge, and short-circuit states in machining using the machining-gap voltage application method of FIGS. 2A to 2C will now be described with reference to FIGS. 3A to 3C.

Figure 3A:
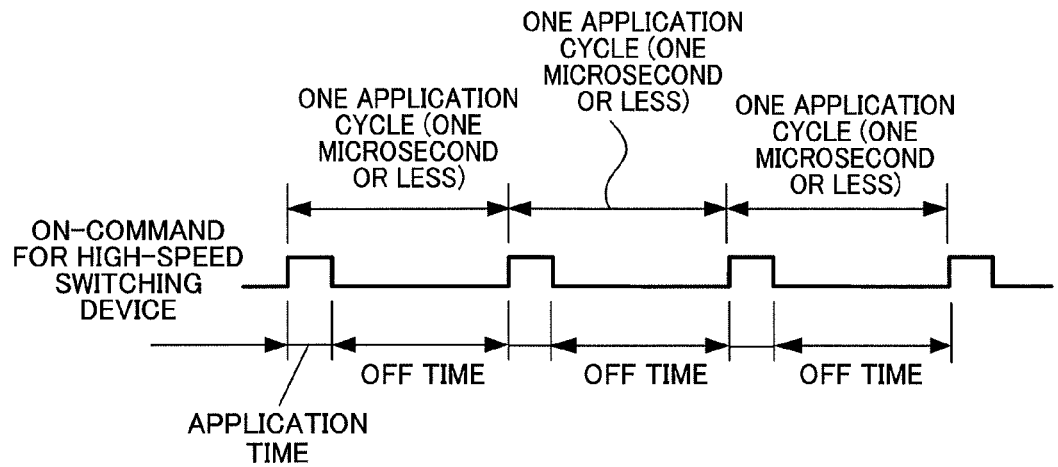
FIGS. 3A to 3C are diagrams illustrating a method of determining open-circuit, electric discharge, and short-circuit states in machining using the machining-gap voltage application method of FIGS. 2A to 2C.
Figure 3B:
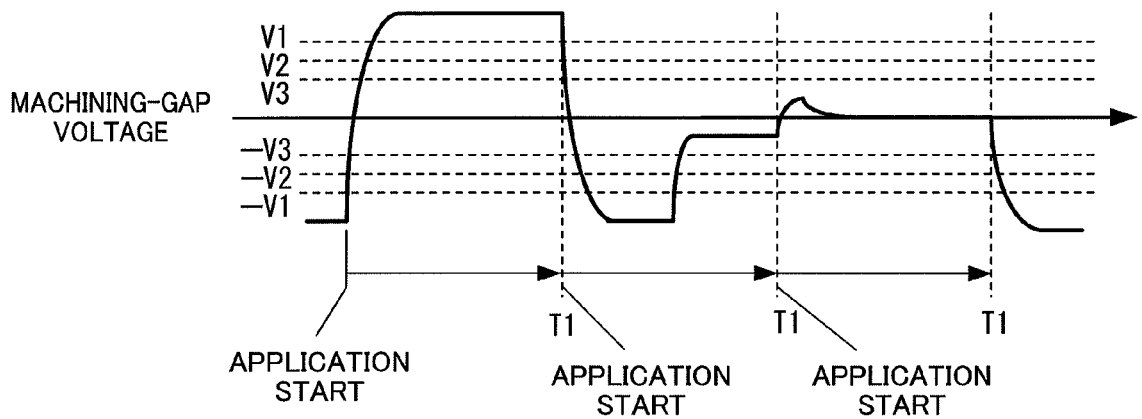
Figure 3C:
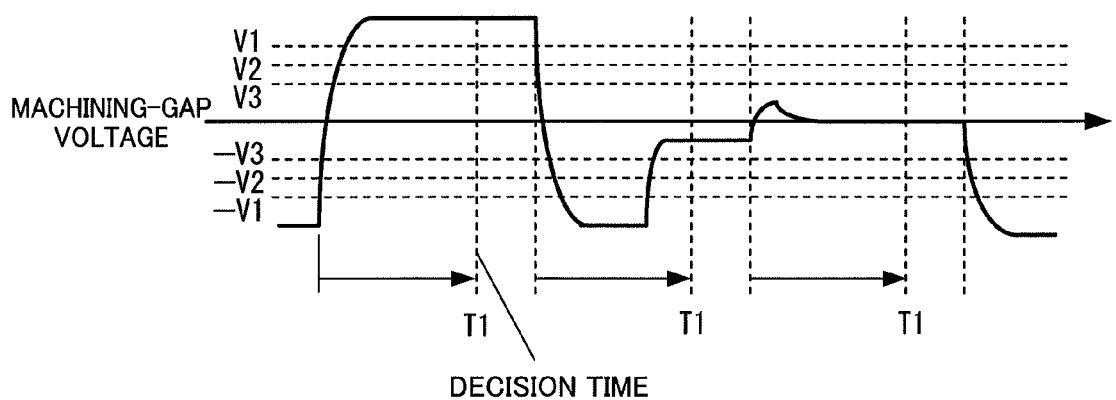

As shown in FIGS. 3A to 3C, a period during which application of a positive or negative voltage is started, stopped, and then started again is assumed to be one application cycle. Symbol T1 denotes a time interval that starts at the start of each application cycle and during which the state in each application cycle is determined. At the start of T1, machining voltage is applied to the machining gap. At the end of T1, a machining state such as open-circuit, electric discharge, short-circuit is detected. Symbol V1 denotes an open-circuit determination voltage level. If the absolute value of the machining-gap voltage is not lower than the open-circuit determination voltage level V1 at the end of the time interval T1, the machining-gap state is determined to be the "open-circuit state". Symbol V2 denotes an electric discharge determination voltage level. If the absolute value of the machining-gap voltage becomes lower than the electric discharge determination voltage level V2 at the end of the time interval T1 after the absolute value of the machining-gap voltage once becomes higher than the electric discharge determination voltage level V2 after the start of voltage application, the machining-gap state is determined to be the "electric discharge state". Symbol V3 denotes a short-circuit determination voltage level. If the short-circuit determination voltage level V3 is not reached or surpassed even once during the interval from the start of voltage application to the end of the time interval T1, the machining-gap state is determined to be the "short-circuit state".

In FIG. 3B, the end point of the time interval T1 is shown to be that of each application cycle. As shown in FIG. 3C, however, it may be any time point within the off time after the application time for each application cycle (i.e., a time point in a certain time after the start of voltage application to the machining gap 11 (FIG. 4)). Although the absolute values of the determination voltage levels are shown to have a relation V1>V2>V3 in FIGS. 3B and 3C, they may be suitably set only if conditions V1≥V2 and V1≥V3 are satisfied. In general, the higher the working power supply voltage, the longer the application time, or the thinner the workpiece, the higher the open-circuit voltage, voltage after electric discharge, and short-circuit voltage tend to be. Thus, decision errors can be prevented more efficiently by setting each determined voltage accordingly higher.

Figure 4:
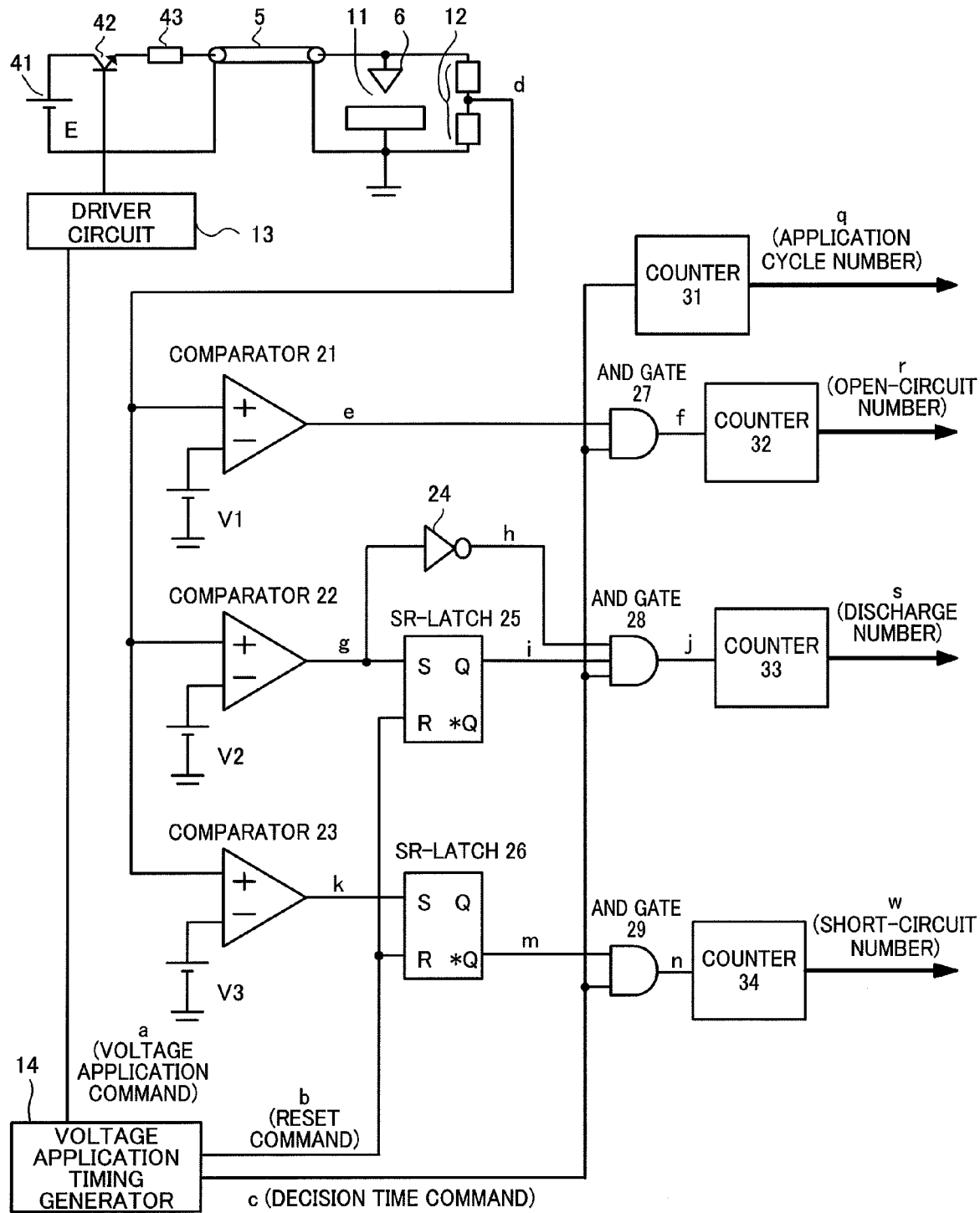
FIG. 4 is a diagram illustrating an example of a machining state determination circuit in a machining state detection unit.
Figure 5:
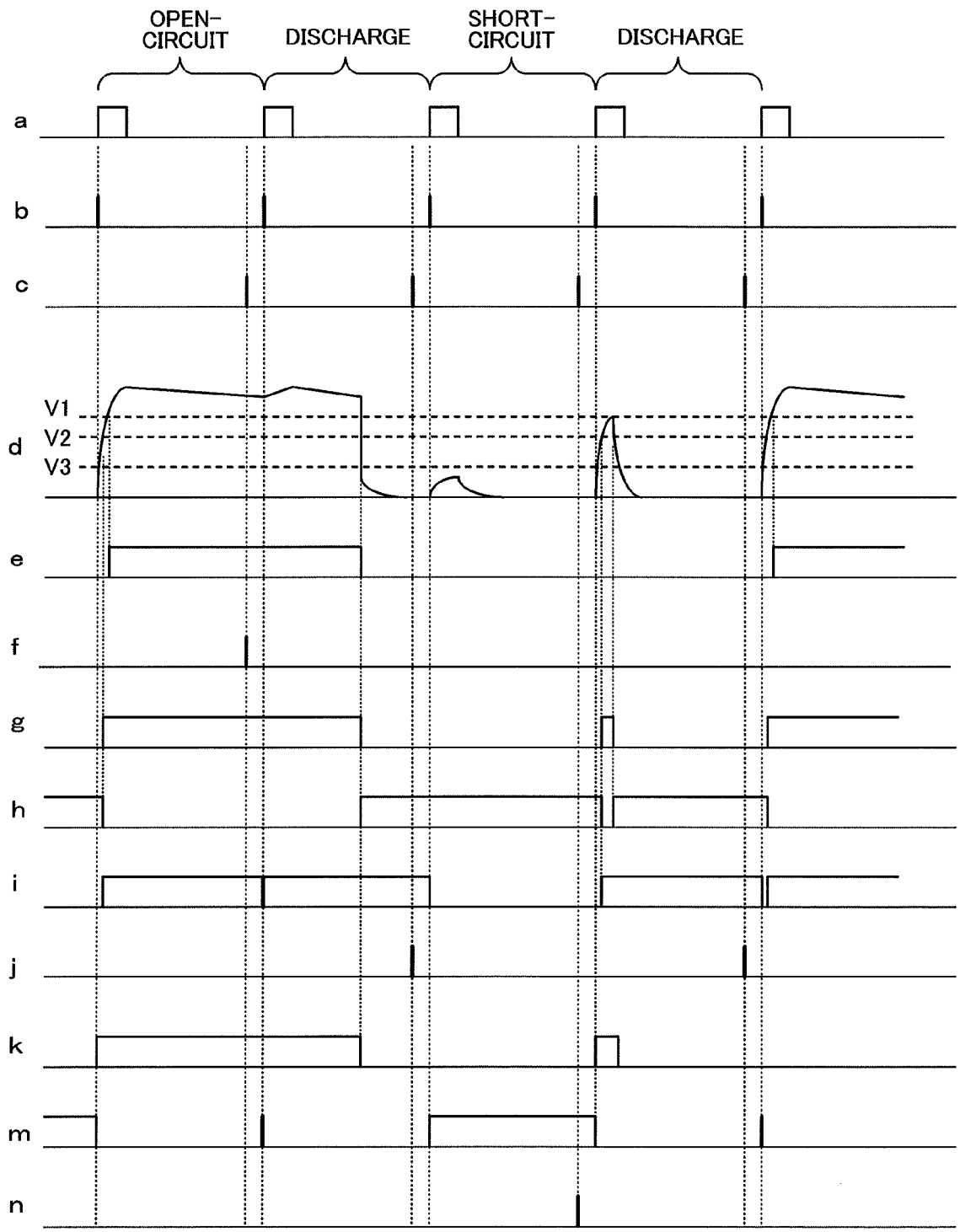
FIG. 5 is a timing chart of the machining state determination circuit of FIG. 4.

FIG. 4 shows an example of the machining state determination circuit in the machining state detection unit 7, and FIG. 5 is a timing chart illustrating its machining state determination. In connection with the present embodiment, only one polarity is described for simplicity. Alternatively, however, the same machining state determination may be performed for the other polarity so that the number of machining states can also be counted for bipolar voltage application by adding up the resulting count values.

Signals for a voltage application command (a), SR-latch reset command (b), and decision time command (c) to turn on the high-speed switching device 42 (FIG. 1) in the working power supply 4 are output from a voltage application timing generator 14 in the working power supply controller 8. The signals for the reset command (b) and the decision time command (c), which is output at the end of the time interval T1, are one-shot pulse signals, as shown in FIG. 5.

A procedure for machining state determination processing will be described with reference to the timing chart of FIG. 5.

When the voltage application command (a) is enabled, a voltage is applied to the machining gap 11, whereupon an output (d) of a machining-gap voltage divider 12 increases. When the output (d) from the machining-gap voltage divider 12 reaches or surpasses the open-circuit determination voltage level V1, electric discharge determination voltage level V2, and short-circuit determination voltage level V3, respective outputs (e), (g) and (k) of comparators 21, 22 and 23 go high, accordingly. Thereupon, SR-latches 25 and 26 are set, an output (i) from the Q-terminal of the SR-latch 25 goes high, and an output (m) from the *Q-terminal of the SR-latch 26 goes low. Further, an output (g) of the comparator 22 is inverted by an inverter 24, and a signal (h) goes low. This state continues until a decision time. When the decision time command (c) is output, an output (f) of an AND gate 27 goes high, while respective outputs (j) and (n) of AND gates 28 and 29 go low. Consequently, only counters 31 and 32 are enabled to count so that the number of application cycles (q) and the number of open-circuits (r) are incremented by one.

Thereafter, when the reset command (b) is output from the voltage application timing generator 14, the SR-latches 25 and 26 are reset. Thereupon, the output (i) from the Q-terminal of the SR-latch 25 goes low, while the output (m) from the *Q-terminal of the SR-latch 26 goes high. Since the respective outputs of the comparators 22 and 23 are still at the high level, in this example, the SR-latches 25 and 26 are set again, so that the outputs (i) and (m) return to the high and low levels, respectively.

Thereafter, the voltage application command (a) is output again from the voltage application timing generator 14, and the machining-gap voltage is kept higher level than the open-circuit determination voltage level V1. When electric discharge occurs, thereafter, the machining-gap voltage is rapidly reduced substantially to the level of an arc voltage, so that the outputs (e), (g) and (k) of the comparators 21, 22 and 23 all go low. Since the voltage application command (a) is already in a low level by this time, the high-speed switching device 42 is turned off, so that this state is maintained until at least the next cycle of voltage application command is output.

When the next decision time is reached, the decision time command (c) is output from the voltage application timing generator 14. Since the output (e) of the comparator 21 is low this time, the respective outputs (f), (m), and (n) of the AND gate 27, SR-latch 26, and AND gate 29 are all low, so that counters 32 and 34 are not enabled to count. Since the inputs (h) and (i) of the AND gate 28 are high, in contrast, its output is also high, so that a counter 33 is enabled to count. This time, as described above, only the counters 31 and 33 are enabled to count, whereupon the number of application cycles (q) and the number of discharges (s) are incremented by one.

Thereafter, when the reset command (b) is output from the voltage application timing generator 14, the SR-latches 25 and 26 are individually reset, so that the output (i) of the SR-latch 25 goes low, while the output (m) of the SR-latch 26 goes high. Then, the voltage application command (a) is output again. If the machining gap 11 is in the short-circuit state so that none of the open-circuit determination voltage level V1, electric discharge determination voltage level V2, and short-circuit determination voltage level V3 is reached by the machining-gap voltage, a reset state is maintained as it is. If the next time interval T1 is directly reached so that the decision time command (c) is output from the voltage application timing generator 14, the inputs (e) of the AND gates 27 and the outputs (h) and (m) of the inverter 24 and the SR-latch 26 are only in a high level. Accordingly, the respective outputs (f) and (j) of the AND gates 27 and 28 go low, and only the output (n) of the AND gate 29 goes high. As a result, the counter 34 is enabled to count, whereupon the application cycle number (q) and the number of short-circuits (w) are incremented by one. In this way, the machining states are counted by the counter for each cycle of voltage application.

The following is a description of a method of determining the average machining-gap voltage based on the application cycle number (q), open-circuit number (r), discharge number (s), and short-circuit number (w) per unit time, counted by the counters 31 to 34.

As described above with reference to FIGS. 2A to 2C, the output of a voltage application circuit is substantially trapezoidal. However, the peak value of the machining-gap voltage is not always equal to the voltage of the DC voltage source 41, depending on the voltage application time, voltage application series resistor 43, electrical constant of the machining gap 11, etc. Thus, the machining-gap voltage in the open-circuit state also varies, so that it is previously measured and stored in a controller. This voltage will be referred to as a "first predetermined voltage".

Also in the case where the machining gap is in the electric discharge state, an average voltage in each cycle varies depending on the timing for the occurrence of electric discharge, so that a substantially average value for the electric discharge state is previously stored in the controller. This voltage will be referred to as a "second predetermined voltage".

If the machining gap is in the short-circuit state, moreover, the machining-gap voltage is not supposed to be fully reduced to zero, and the contact voltage between the electrode 1 and the workpiece 2, electric resistance of the wire electrode 1, and induced voltage based on inductance are measured. The machining-gap voltage in this short-circuit state will be referred to as a "third predetermined voltage". Although this third predetermined voltage also varies depending on the working power supply voltage, wire diameter, workpiece thickness, workpiece material, etc., its variation is lower than those of the first and second predetermined voltages.

The average machining-gap voltage is calculated as follows:

Average machining-gap voltage={(open-circuit number×first predetermined voltage)+(discharge number×second predetermined voltage)+(short-circuit number×third predetermined voltage)}/(application cycle number), based on the individually counted open-circuit number, discharge number, and short-circuit number and the previously stored first to third predetermined voltages.

In the example described above, the machining-gap voltage is calculated in consideration of all the categories of the machining-gap state. In general, however, the short-circuit voltage (third predetermined voltage) is considerably lower than the other voltages (first and second predetermined voltages), so that substantially the same result can be obtained by simply calculating the average machining-gap voltage without regard to the short-circuit voltage as follows:

Average machining-gap voltage={(open-circuit number×first predetermined voltage)+(discharge number×second predetermined voltage)}/(application cycle number).

The machining-gap voltage is shown to be trapezoidal in FIG. 2C. In an actual circuit, however, vibration occurs between the voltage application unit and the machining gap, so that voltage may fail to be constant after the machining gap voltage reached to peak value. Furthermore, the voltage may sometimes be kept substantially at the level of an arc voltage without being reduced to zero after an electric discharge occurs. In some cases, therefore, it is difficult to securely distinguish between the open-circuit state and the electric discharge state in an actual wire electric discharge machine. In the short-circuit state, in contrast, the machining-gap voltage is kept at a relatively low level, as mentioned before, so that it is easier to distinguish between the short-circuit state and the open-circuit or electric discharge state. In an alternative available method, therefore, only the short-circuit state may be detected so that an average machining-gap voltage less susceptible to decision errors can be calculated as follows:

Average machining-gap voltage=(application cycle number−short-circuit number)×(fourth predetermined voltage)/(application cycle number).

However, this method is inferior to the above two methods in the precision of detection of the average voltage.

The fourth predetermined voltage is an average voltage in the machining gap 11 in the open-circuit and electric discharge states. Since the voltage in the electric discharge state drastically varies, as mentioned before, the open-circuit voltage may be represented by the fourth predetermined voltage without extreme errors in the value of the average machining-gap voltage to be determined.

Preferably, in order to reduce the error of decision of the machining state, at least one of determination voltage levels for determining the open-circuit, electric discharge, and short-circuit states or at least one of the predetermined first to fourth voltages should be made variable depending on the power supply voltage of the voltage application unit, workpiece thickness, wire diameter, and/or workpiece material.

Thus, a machining state for each voltage application cycle is determined in a high-precision finish machining application, based on a high-frequency AC voltage, and an average voltage is determined for each unit time, whereby an average voltage depending on a correct machining state can be determined to enable correct control of the electrode feed rate and other machining condition settings even when the analog average voltage is affected by various disturbances.

The invention claimed is:

1. A wire electric discharge machine capable of detecting a machining state and determining an average voltage in a machining gap between a wire electrode and a workpiece, comprising:

a voltage application unit configured to apply positive and negative voltages to the machining gap for a period of one microsecond or less with an off time equal to or longer than a voltage application time set during each cycle of voltage application;

a machining-gap voltage detection unit configured to detect a machining-gap voltage produced in the machining gap;

an application cycle number counting unit configured to count for each unit time the number of application cycles of the voltages applied by the voltage application unit;

an open-circuit determination unit configured to determine an open-circuit state in which electric discharge does not occur after a predetermined open-circuit determination voltage level is reached or surpassed by the machining-gap voltage detected by the machining-gap voltage detection unit;

an open-circuit number counting unit configured to count for each unit time the number of voltage application cycles determined to be in an open-circuit state by the open-circuit determination unit, as an open-circuit number;

an electric discharge determination unit configured to determine an electric discharge state in which electric discharge occurs after a predetermined electric discharge determination voltage level is reached or surpassed by the machining-gap voltage detected by the machining-gap voltage detection unit, then the machining-gap voltage becomes lower than the electric discharge determination voltage level; and a discharge number counting unit configured to count for each unit time the number of voltage application cycles determined to be in an electric discharge state by the electric discharge determination unit, as a discharge number, wherein the average voltage in the machining gap is determined based on a first predetermined voltage corresponding to the machining-gap voltage in the open-circuit state, a second predetermined voltage corresponding to the machining-gap voltage in the electric discharge state, the number of voltage application cycles per unit time counted by the application cycle number counting unit, the open-circuit number per unit time counted by the open-circuit number counting unit, and the discharge number per unit time counted by the discharge number counting unit.

2. The wire electric discharge machine according to claim 1, wherein the average voltage in the machining gap is calculated as follows:

Average machining-gap voltage={(open-circuit number×first predetermined voltage)+(discharge number×second predetermined voltage)}/(application cycle number).

3. The wire electric discharge machine according to claim 1, wherein at least one of the determination voltage levels for the determination of the open-circuit state and the electric discharge state is variable depending on a power supply voltage of the voltage application unit, a workpiece thickness, a wire diameter, and/or a workpiece material.

4. The wire electric discharge machine according to claim 1, wherein at least one of the first and second predetermined voltages is variable depending on a power supply voltage of the voltage application unit, a workpiece thickness, a wire diameter, and/or a workpiece material.

5. A wire electric discharge machine capable of detecting a machining state and determining an average voltage in a machining gap between a wire electrode and a workpiece, comprising:

a voltage application unit configured to apply positive and negative voltages to the machining gap for a period of one microsecond or less with an off time equal to or longer than a voltage application time set during each cycle of voltage application;

a machining-gap voltage detection unit configured to detect a machining-gap voltage produced in the machining gap;

an application cycle number counting unit configured to count for each unit time the number of application cycles of the voltages applied by the voltage application unit;

an open-circuit determination unit configured to determine an open-circuit state in which electric discharge does not occur after a predetermined open-circuit determination voltage level is reached or surpassed by the machining-gap voltage detected by the machining-gap voltage detection unit;

an open-circuit number counting unit configured to count for each unit time the number of voltage application cycles determined to be in an open-circuit state by the open-circuit determination unit, as an open-circuit number;

an electric discharge determination unit configured to determine an electric discharge state in which electric discharge occurs after a predetermined electric discharge determination voltage level is reached or surpassed by the machining-gap voltage detected by the machining-gap voltage detection unit, then the machining-gap voltage becomes lower than the electric discharge determination voltage level;

a discharge number counting unit configured to count for each unit time the number of voltage application cycles determined to be in an electric discharge state by the electric discharge determination unit, as a discharge number;

a short-circuit determination unit configured to determine a short-circuit state in which a predetermined short-circuit determination voltage level is not reached or surpassed by the machining-gap voltage detected by the machining-gap voltage detection unit during 1 cycle of the voltage application; and a short-circuit number counting unit configured to count for each unit time the number of voltage application cycles determined to be in a short-circuit state by the short-circuit determination unit, as a short-circuit number, wherein the average voltage in the machining gap is determined based on a first predetermined voltage corresponding to the machining-gap voltage in the open-circuit state, a second predetermined voltage corresponding to the machining-gap voltage in the electric discharge state, a third predetermined voltage corresponding to the machining-gap voltage in the short-circuit state, the number of application cycles per unit time counted by the application cycle number counting unit, the open-circuit number per unit time counted by the open-circuit number counting unit, the discharge number per unit time counted by the discharge number counting unit, and the short-circuit number per unit time counted by the short-circuit number counting unit.

6. The wire electric discharge machine according to claim 5, wherein the average voltage in the machining gap is calculated as follows:

Average machining-gap voltage={(open-circuit number×first predetermined voltage)+(discharge number×second predetermined voltage)+(short-circuit number×third predetermined voltage)}/(application cycle number).

7. The wire electric discharge machine according to claim 5, wherein at least one of the determination voltage levels for the determination of the open-circuit state, the electric discharge state, and the short-circuit state is variable depending on a power supply voltage of the voltage application unit, a workpiece thickness, a wire diameter, and/or a workpiece material.

8. The wire electric discharge machine according to claim 5, wherein at least one of the first to third predetermined voltages is variable depending on a power supply voltage of the voltage application unit, a workpiece thickness, a wire diameter, and/or a workpiece material.

9. A wire electric discharge machine capable of detecting a machining state and determining an average voltage in a machining gap between a wire electrode and a workpiece, comprising:

a voltage application unit configured to apply positive and negative voltages to the machining gap for a period of one microsecond or less with an off time equal to or longer than a voltage application time set during each cycle of voltage application;

a machining-gap voltage detection unit configured to detect a machining-gap voltage produced in the machining gap;

an application cycle number counting unit configured to count for each unit time the number of application cycles of the voltages applied by the voltage application unit;

a short-circuit determination unit configured to determine a short-circuit state in which a predetermined short-circuit determination voltage level is not reached or surpassed by the machining-gap voltage detected by the machining-gap voltage detection unit during 1 cycle of the voltage application; and a short-circuit number counting unit configured to count for each unit time the number of voltage application cycles determined to be in a short-circuit state by the short-circuit determination unit, as a short-circuit number, wherein the average voltage in the machining gap is determined based on a fourth predetermined voltage corresponding to the machining-gap voltage in the open-circuit state and the electric discharge state, the number of application cycles per unit time counted by the application cycle number counting unit, and the short-circuit number per unit time counted by the short-circuit number counting unit.

10. The wire electric discharge machine according to claim 9, wherein the average voltage in the machining gap is calculated as follows:

Average machining-gap voltage=(application cycle number−short-circuit number)×(fourth predetermined voltage)/(application cycle number).

11. The wire electric discharge machine according to claim 9, wherein the determination voltage level for the determination of the short-circuit state is variable depending on a power supply voltage of the voltage application unit, a workpiece thickness, a wire diameter, and/or a workpiece material.

12. The wire electric discharge machine according to claim 9, wherein the fourth predetermined voltage is variable depending on a power supply voltage of the voltage application unit, a workpiece thickness, a wire diameter, and/or a workpiece material.

* * * * *